Oct. 31, 1933.   B. D. BEDFORD   1,933,303
ELECTRIC POWER CONVERTING APPARATUS
Filed Sept. 29, 1930   2 Sheets-Sheet 1

Inventor:
Burnice D. Bedford,
By Charles E. Tullar
His Attorney.

Oct. 31, 1933.  B. D. BEDFORD  1,933,303
ELECTRIC POWER CONVERTING APPARATUS
Filed Sept. 29, 1930   2 Sheets-Sheet 2

Inventor:
Burnice D. Bedford,
by Charles V. Tuller
His Attorney.

Patented Oct. 31, 1933

1,933,303

UNITED STATES PATENT OFFICE 1,933,303

ELECTRIC POWER CONVERTING APPARATUS

Burnice D. Bedford, Schenectady, N. Y., assignor to General Electric Company, a corporation of New York Application September 29, 1930
Serial No. 485,336

15 Claims. (Cl. 175—363)

My invention relates to apparatus for transmitting electric energy between direct current and alternating current circuits and more particularly to an improved apparatus for transmitting electric energy from a direct current circuit to a polyphase alternating current circuit by means of a plurality of grid controlled electric valves.

Heretofore it has been proposed to transmit power from a direct current system to a polyphase alternating current system by means of a polyphase inverter either oscillating at its natural frequency or synchronously driven by a polyphase excitation system. However, it is not always possible to obtain polyphase alternating potential for the grid excitation and in certain other cases it simplifies the apparatus and is otherwise advantageous to use single phase alternating potential for the grid excitation.

It is an object, therefore, of my invention to provide an improved apparatus for transmitting power from a direct current circuit to a polyphase alternating current circuit by the use of grid controlled electric valves supplied with single phase grid excitation.

In accordance with my invention I provide an apparatus for transmitting energy from a direct current circuit to a polyphase alternating current circuit comprising a pair of single phase inverters each including a pair of electric valves. The grid circuits of the electric valves of the two inverters are energized with single phase alternating potentials of opposite polarity. These single phase potentials are of a very peaked wave form and, in combination with a negative bias battery in the grid circuits of the several valves, impress positive potentials upon the grids of the several valves for the duration of only a small fraction of a cycle. The polyphase alternating current delivered by the apparatus will have a frequency one half of that of the grid exciting potential. In accordance with a modification of my invention a single phase alternating potential of peaked wave form is applied to the grid circuit of the several valves of a polyphase power converting apparatus. There is included in the grid circuit of the valve of each phase a potential derived from the next succeeding phase in order to assure that the several electric valves will be rendered conducting in the proper sequence.

Figure 1:
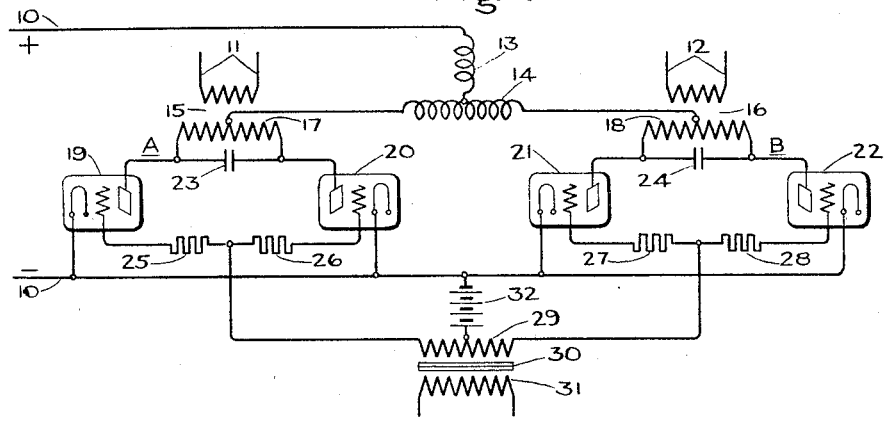
Figure 2:
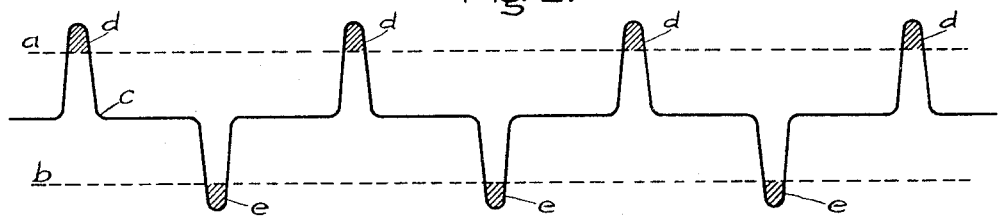
Figure 3:
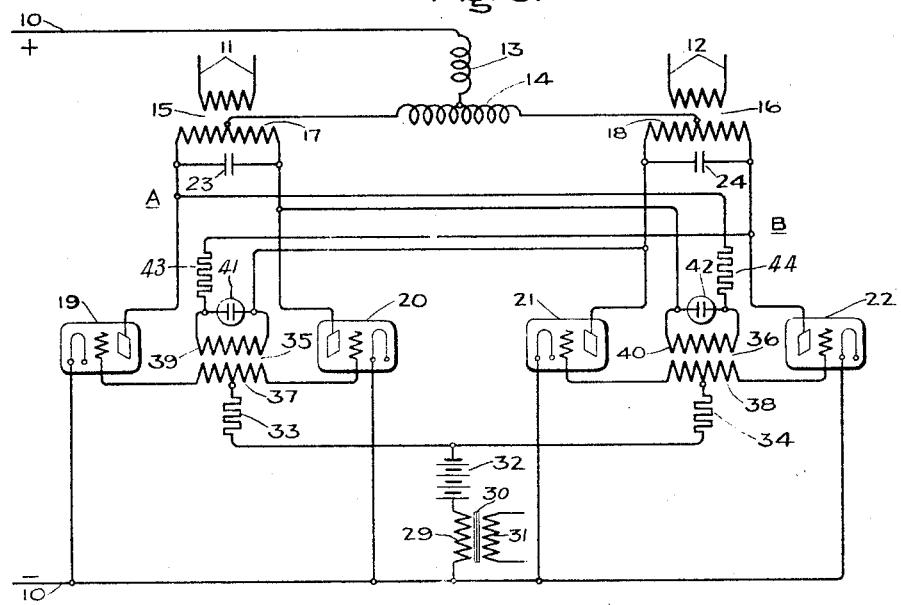
Figure 4:
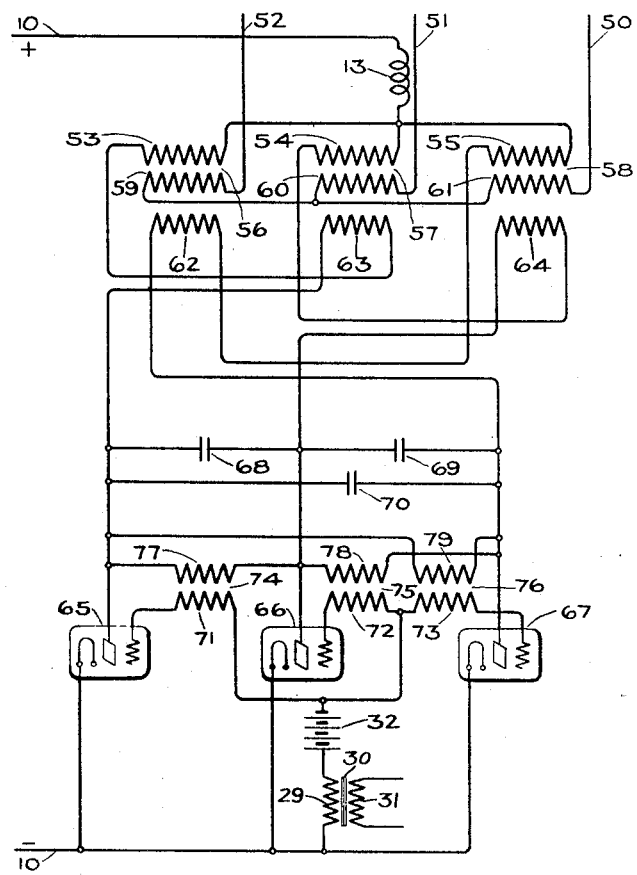

For a better understanding of my invention together with other and further objects thereof, reference is had to the following description taken in connection with the accompanying drawings and its scope will be pointed out in the appended claims. In the accompanying drawings Fig. 1 is a schematic illustration of an embodiment of my invention as applied to an apparatus for converting direct current energy into two phase alternating current; Fig. 2 shows the wave form of single phase grid excitation which may be used in connection with my invention; Fig. 3 represents a modification of Fig. 1 for obtaining two phase alternating current and Fig. 4 shows an arrangement for obtaining three phase alternating current by the use of my invention.

Referring more particularly to Fig. 1 of the drawings, I have illustrated an apparatus comprising the inverters A and B for transmitting electric energy from a direct current circuit 10 to a two phase alternating current circuit comprising phases 11 and 12. The positive direct current line 10 is connected to the inverters A and B through a smoothing reactor 13 and an interphase transformer 14 for securing an equal division of load between the two phases. The inverters A and B as shown in this figure are of the so-called parallel type well known in the art, although it is apparent that a series type inverter, such, for example, as disclosed in United States Letters Patent No. 1,752,247, granted March 25, 1930, upon the application of A. S. FitzGerald, might be used, if desired, without departing from my invention. The inverter A comprises the primary winding 17 of a transformer 15, a pair of electric valves 19 and 20 connected between the terminals of the winding 17 and the negative direct current line, and a capacitor 23 connected between the valve circuits for commutating the current between them. Similarly the inverter B comprises the winding 18 of a transformer 16, the electric valves 21 and 22 and the commutating capacitor 24. The cathodes of the valves 19 to 22 are connected together and to the negative direct current terminal 10. The control grids of the valves 19 and 20 are interconnected through resistors 25 and 26 and a similar connection is made for the grids of the valves 21 and 22 through resistors 27 and 28. The control potential for the grid circuit of the valves 19 and 22 is furnished from the secondary winding 29 of a grid transformer 30, the primary winding 31 of which is supplied with alternating current of a frequency double that of the desired output frequency as will be explained hereinafter. The electrical midpoint of the secondary winding 29 is connected through a negative bias battery 32 to the cathode circuit of the valves.

The electric valves 19 to 22 are preferably of the vapor electric discharge type although any form of discontinuous control electric valves may be used. By the term "discontinuous control electric valve" I mean that type of electric valve in which the starting of current through the valve is determined by the excitation of a control electrode but in which the current through the valve may be interrupted only by reducing the anode potential below its critical value. This type of valve is to be distinguished from the continuous control electric valve, of which the high vacuum tube is a typical example, in which the instantaneous current through the valve is continuously determined by the excitation of a control electrode.

The winding 29 is adapted to supply an alternating potential of peaked wave form, such for example as that shown in Fig. 2 of the drawings. Such a wave form may be obtained by any of several means well known in the art but I prefer to furnish such a wave form by operating the transformer 30 considerably beyond its saturation point and energizing its primary winding 31 from a source of alternating current of sine wave form. However, the broad idea of exciting the grid of an electric valve with an alternating potential of peaked wave form forms no part of the invention covered by this application but is disclosed and claimed in my copending application Serial No. 485,335, filed September 29, 1930, and assigned to the same assignee as the present application.

The operation of the system illustrated in Fig. 1 will be clear from the following explanation. It is seen that when alternating potential is impressed upon the primary winding of the transformer 30, the grids of the valves 19 and 20 are both excited at the same potential. This potential is shown as the shaded portion $d$ of the wave $c$ in Fig. 2 in which the line $a$ represents the negative bias of the battery 32; that is, once during each cycle of the grid excitation a short positive impulse is given each of the grids. However, it has been proved by experience that both valves in such a circuit will not be rendered conducting at the same time but that current will flow through one or the other of the valves. It will be assumed that current flows first through the valve 19. When the next positive impulse of grid potential occurs the valve 20 will be made conducting and the commutating capacitor 23 will discharge through the valves 20 and 19 and instantly interrupt the flow of current in the valve 19 as will be well understood by those skilled in the art. For the satisfactory operation of the arrangement thus described it is necessary that the duration of this positive impulse of grid excitation should be less than that required for the discharge of the capacitor 23 so that by the time a positive voltage again appears on the anode of the valve 19 its grid will again have a negative potential to render it nonconducting. Similarly current will be transferred from the valve 20 to the valve 19 at the next positive impulse of grid excitation and this cycle will be repeated indefinitely producing an alternating current in the circuit 11.

The grid circuit of the valves 21 and 22 is supplied from the opposite half of the secondary winding 29 from that which is connected to the grid circuit of the valves 19 and 20. The potential applied to the grids of the former is 180° out of phase with that applied to the valves 19 and 20. The result is that the negative halfwaves of the curve $c$ are positive with respect to the cathodes of these valves and combined with the negative bias of the battery 32 occur as positive impulses upon the grids of the valves 21 and 22 as shown by the shaded portions $e$ of the curve $c$. It is obvious that the inverter B will deliver alternating current to the circuit 12 in a manner exactly similar to the operation of inverter A but 180° out of phase with reference to the grid potential. However, it is seen from what has been explained that two positive impulses of grid excitation are required to complete one cycle in each of the inverters so that the output of the transformers 15 and 16 is of a frequency which is one half that of the grid potential. Hence the output of inverter B is 90° out of phase with that of inverter A with respect to the potential of the circuits 11 and 12 and a two phase alternating current is delivered by the system. While I have illustrated in Fig. 1 the use of my invention to produce two phase alternating current, it is obvious that only a single inverter might be used, if desired, in which case single phase alternating current of a frequency one-half that of the grid potential would be obtained; that is, from another aspect my invention constitutes an apparatus for dividing the frequency of an alternating current circuit.

In Fig. 3 I have shown a modification of my invention in which the same grid exciting potential is applied to all four of the electric valves 19 to 22. In order that the valves shall be rendered conducting in the order 19, 21, 20 and 22, as in the previous arrangement, there is impressed upon the grid circuit of each inverter a potential derived from the other inverter. This auxiliary potential for the inverter A is obtained from the secondary winding 37 of a transformer 35, the opposite halves of which are connected to the grids of the electric valves 19 and 20. The primary winding 39 of this transformer is connected across the alternating current circuit of the inverter B and a constant potential device, such as a glow lamp 41, is connected across the terminals of the primary winding 39 to maintain a substantially constant alternating potential. Similarly an auxiliary potential is impressed upon the grid circuit of the valves 21 and 22 by means of the secondary winding 38 of a transformer 36, the primary winding 40 of which is energized from the alternating current side of the inverter A and a constant potential device 42 is connected across the terminals of the primary winding 40. In some cases, it may be found desirable to include current limiting resistors 43 and 44 in the circuits of the glow lamps 41 and 42 respectively.

In explaining the operation of the modification shown in Fig. 3, it will be assumed, as before, that the valve 19 is first made conducting. In this case, however, it will be assumed that the valve 22 is also made conducting. Upon the occurrence of the next positive impulse of grid excitation, the polarity of the potential induced by the transformer 35 in the grid circuit of inverter A is such as to act differentially with this positive potential impulse upon the grid of the valve 20 with the result that this valve is not made conducting. However, the potential induced by the transformer 36 upon the grid of the valve 21 is cumulative with that of the grid excitation impulse and this valve is made conducting, the current being transferred from the valve 22 to the valve 21 as explained above. This reversal of current in the inverter B reverses the polarity of the potential applied to the grids of the valves 19 and 20 by the transformer 35 so that upon the occurrence of the next positive impulse of grid excitation the valve 20 is made conducting. In turn the reversal of current in inverter A reverses the polarity of the potential of the transformer 36 with the result that the valve 22 is next made conducting and this cycle is repeated indefinitely, the valves being made conducting in the order 19, 21, 20 and 22 as in the arrangement shown in Fig. 1 and, as in that figure, a two phase alternating current is delivered to the circuits 11 and 12. In this case, it will be seen that the frequency of the alternating current circuits 11 and 12 is one fourth of the grid exciting potential.

In Fig. 4 I have illustrated my invention as applied to apparatus for converting direct current into three phase alternating current. In this arrangement, the direct current circuit 10 is interconnected with the alternating current circuit 50, 51 and 52 through transformers 56, 57 and 58 and electric valves 65, 66 and 67. The positive direct current line is connected through a smoothing reactor 13 to the neutral point of the Y-connected primary windings 53, 54 and 55. The outer terminals of these primary windings and the negative direct current line 10 are interconnected through electric valves 65, 66 and 67. In the several circuits of the valves 65, 66 and 67 are serially connected the windings 62, 63 and 64 each inductively associated with the transformer in the next succeeding phase, that is, the winding 63 included between the primary winding 53 and the valve 65 is inductively related to the transformer 57, etc. The alternating current lines 50, 51 and 52 are energized from the Y-connected secondary windings 59, 60 and 61 respectively. Capacitors 68, 69 and 70 are connected between several valve circuits for facilitating the transfer of current between them. The grid circuits for the valves 65, 66 and 67 include the negative bias battery 32 and the winding 29 which is energized from any desired source of periodic peak potential, and the secondary windings 71, 72 and 73 of transformers 74, 75 and 76 respectively. The primary windings 77, 78 and 79 of these transformers are energized between their respective valve circuit and the next succeeding valve circuit in the direction of phase rotation.

The operation of this arrangement is similar to that described in connection with Fig. 3. Each of the three valves receive a positive impulse of grid excitation at the same time but only that valve is made conducting which also has a positive potential from its associated grid transformer; for example, as soon as the electric valve 65 is first made conducting current will then flow from the positive direct current line through the primary winding 53, the winding 63, the valve 65 to the negative direct current terminal. The flow of current through the winding 63 induces a still more positive potential in the winding 54 so that the left hand terminal of the primary winding 78 of the transformer 75 is above direct current line potential. Similarly, a potential is induced in the winding 62 due to the flow of current in the winding 53 so that the anode of the valve 67 is of the same potential as the anode of the valve 66 and no current is delivered by the grid transformer 75. However, the anode of the valve 65 is at approximately the same potential as the negative direct current line 10 and a corresponding negative potential is applied through the transformer 76 to the grid of the valve 67. Hence, when the next positive impulse of grid excitation occurs, the valve 66 will be rendered conducting. In a similar manner each of the several valves 65, 66 and 67 will be rendered successively conducting. The connection of the primary windings 53, 54 and 55 and of the windings 62, 63 and 64, which, in fact, are also primary windings, constitute the so-called zig-zag connection well known in the art. By means of this well known connection of the primary windings of the transformers 56, 57 and 58, full wave inversion is obtained by the use of three electric valves since the current flowing in the auxiliary windings 62, 63, and 64 is opposite in direction to that flowing in the main windings 53, 54 and 55. This connection is also advantageous in that it tends to eliminate any direct current component in the transformers which would tend to saturate the cores and it serves to definitely limit the short circuit current in the case of a fault in any one of the valves. It will be obvious to those skilled in the art that the arrangement illustrated in Fig. 4 may be extended to a polyphase system of any number of phases without departing from my invention.

While I have described what I at present consider preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. An apparatus for transmitting energy from a direct current system to an alternating current system, comprising a plurality of parallel circuits for interconnecting the systems, each of said circuits including a discontinuous control electric valve provided with a control grid, means for commutating the current between the several electric valves, and means for simultaneously impressing upon said grids periodic peaked potential impulses to render the valves of the several circuits successively conductive.

2. An apparatus for transmitting energy from a direct current system to an alternating current system, comprising a plurality of parallel circuits for interconnecting said systems, each of said circuits including a discontinuous control electric valve provided with a control grid, means connected between certain of said circuits to commutate the current between said circuits, and means for impressing simultaneously upon said grids periodic peaked potential impulses of a time duration less than that required for the operation of said commutating means, to render successively conductive the valves of the several circuits.

3. An apparatus for transmitting energy from a direct current system to an alternating current system, comprising a plurality of parallel circuits for interconnecting said systems, each of said circuits including a discontinuous control electric valve provided with a control grid, means for maintaining a negative bias upon said grids, and means for momentarily overcoming said bias by simultaneously impressing upon said grids periodic peaked positive potential impulses to render the valves of the several circuits successively conductive.

4. An apparatus for transmitting energy from a direct current system to a polyphase alternating current system, comprising a plurality of parallel circuits for interconnecting said systems, each of said circuits including a discontinuous control electric valve provided with a control grid, commutating capacitors connected between crtain of said circuits, and means for simultaneously impressing upon said grids single phase alternating peaked potential impulses of a time duration less than that required to discharge the commutating capacitors, to render the several valves successively conductive.

5. An apparatus for transmitting energy from a direct current system to a two-phase alternating current system, comprising a pair of single-phase inverters for connection in parallel between said systems, each of said inverters including a transformer, a pair of discontinuous control electric valves provided with control grids, and a commutating capacitor, and means for simultaneously impressing upon said grids periodic peaked potential impulses of a time duration less than that required to discharge said capacitors, to render the several valves successively conductive.

6. An apparatus for transmitting energy from a direct current system to a two-phase alternating current system, comprising a pair of single-phase inverters for connection in parallel between said systems, each of said inverters including a pair of discontinuous control electric valves provided with control grids, and means for simultaneously impressing upon the grids of the valves associated with the two inverter circuits, peaked alternating potential impulses differing substantially 180° in phase, to render said valves successively conductive.

7. An apparatus for transmitting energy from a direct current system to a two-phase alternating current system, comprising a pair of single-phase inverters for connection in parallel between said systems each including a transformer, a commutating capacitor connected across said transformer, discontinuous control electric valves including a cathode, an anode and a control grid, connected between the terminals of said transformer and one side of the direct current system; a reactor, the electrical mid-point of which is connected to the other side of the direct current system and the terminals of which are connected to the electrical mid-points of the primary windings of the inverter transformers; circuits including a bias battery connected between the cathodes and grids of the several valves, a saturating transformer the electrical mid-point of whose secondary winding is connected to said bias battery and the terminals of which are connected to said grid circuits, means for energizing said saturating transformer with alternating current of a frequency double that of the alternating current system, and connections between the secondary windings of said inverter transformers and the two phases of said alternating current system.

8. An apparatus for transmitting energy from a direct current system to a two-phase alternating current system, comprising a pair of single-phase inverters for connection in parallel between said systems, each of said inverters including a pair of discontinuous control electric valves provided with control grids, means for simultaneously impressing upon the grids periodic peaked potential impulses, and cooperating means energized from one inverter for controlling the grid potential of the other, to render said valves successively conductive.

9. An apparatus for transmitting energy from a direct current system to a two-phase alternating current system, comprising a pair of single-phase inverters for connection in parallel between said systems, each of said inverters including a pair of discontinuous control electric valves provided with control grids, and a grid circuit for each inverter, and said grid circuits including a common source of periodic peaked potential impulses and each of said grid circuits including a source of substantially constant alternating potential derived from the other inverter circuit, to render the valves successively conductive.

10. An apparatus for transmitting energy from a direct current system to a two-phase alternating current system, comprising a pair of single-phase inverters for connection in parallel between said systems, each of said inverters including a pair of discontinuous control electric valves provided with control grids, a grid circuit for each inverter, said grid circuits including a common source of periodic peaked potential impulses, each of said grid circuits including also a grid transformer provided with a primary winding energized from the other inverter circuit, and a constant potential device connected across the primary of said transformer, whereby said valves are rendered successively conductive.

11. An apparatus for transmitting energy from a direct current system to a two-phase alternating current system, comprising a pair of single-phase inverters for connection in parallel between said systems, said inverters each including a pair of discontinuous control electric valves provided with control grids, a grid transformer, a grid circuit for each inverter comprising a connection to the cathode of both valves, a source of periodic peaked potential impulses, a source of negative bias potential, and a connection to the electrical mid-point of the secondary winding of said transformer, the outer terminals of which are connected to the grids of the pair of valves, the primary of said transformer being connected across the other inverter circuit, and a constant potential device connected across the primary of said grid transformer.

12. An apparatus for transmitting energy from a direct current system to a polyphase alternating current system, comprising a parallel circuit for each phase for interconnecting said systems, each of said circuits including a discontinuous control electric valve provided with a control grid, a grid circuit for each of said grids, said grid circuits including a common source of periodic peaked potential impulses and each of said grid circuits including also a potential dependent upon the difference in potential of its respective phase and that of the next succeeding phase.

13. An apparatus for transmitting energy from a direct current system to a polyphase alternating current system, comprising a parallel circuit for each phase for interconnecting said systems, each of said circuits including a discontinuous control electric valve provided with a control grid, a grid circuit for each of said grids, said grid circuits including a common source of periodic peaked potential impulses and each of said grid circuits including also a grid transformer, the primary winding of said transformer being connected across its respective phase and the next succeeding phase.

14. An apparatus for transmitting energy from a direct current system to polyphase alternating current system, comprising a parallel circuit for each phase for interconnecting said systems, each of said circuits being inductively associated with the next succeeding phase circuit and each of said circuits including a discontinuous control electric valve provided with a control grid, capacitors connected between the several circuits for commutating the current between them, and a grid circuit for each of said valve grids, said grid circuits including a common source of periodic peaked potential impulses.

15. An apparatus for transmitting energy from a direct current system to a three phase alternating current system comprising a transformer for each phase, said transformers having their secondary windings connected to said alternating current system, a parallel circuit for each phase for interconnecting said systems, each of said circuits including the primary winding of one of said transformers, a winding inductively associated with the next succeeding phase, and a discontinuous control electric valve provided with a control grid, commutating capacitors connected between the several phases, a grid transformer for each of the several phases and a grid circuit for each of said valve grids connected between the corresponding cathode and grid and including a source of negative bias potential and the secondary winding of one of said grid transformers, the primary windings of said grid transformers being connected between the corresponding phase circuit and the next succeeeding phase circuit, said grid circuits including also a common source of periodic peaked potential impulses.

BURNICE D. BEDFORD.